United States Patent

[11] 3,594,550

[72] Inventors David Theodore Nelson Williamson;
Douglas William Ballantyne Muir; Richard Graham Grosland; Edward Henry Parke, all of Deptford, England
[21] Appl. No. 759,740
[22] Filed Sept. 13, 1968
[45] Patented July 20, 1971
[73] Assignee Molins Machine Company Limited
London, England
[32] Priority Sept. 13, 1967
[33] Great Britain
[31] 41,870/67

[54] METHODS OF AND APPARATUS FOR IDENTIFYING ARTICLES, E. G. IN AN AUTOMATICALLY CONTROLLED SYSTEM
3 Claims, 4 Drawing Figs.
[52] U.S. Cl. .................................................... 235/61.11D
[51] Int. Cl. .................................................... G06k 7/08
[50] Field of Search ............................:............ 235/61.11,
61.11 D; 340/174.1 H, 174.1 R, 174 JA, 174 AG

[56] References Cited
UNITED STATES PATENTS
2,908,278 10/1959 Goerlich ..................... 235/61.11 UX
3,210,527 10/1965 Daykin ....................... 235/61.11
3,215,820 11/1965 Heard, Jr. ................... 235/61.11
3,317,714 5/1967 Hausler et al. ............. 235/61.11
Primary Examiner—Daryl W. Cook
Attorneys—Emory L. Groff and Emory L. Groff, Jr.

ABSTRACT: Apparatus for sensing identifying markings on articles, consisting of markers of two kinds, magnetic and nonmagnetic, selected to represent a binary number (the two kinds of marker corresponding to the digits 0 and 1) comprises one or more electromagnetic sensing devices, each device having a magnetic circuit into which a marker can be placed to produce an electric output governed by the reluctance of the magnetic circuit.

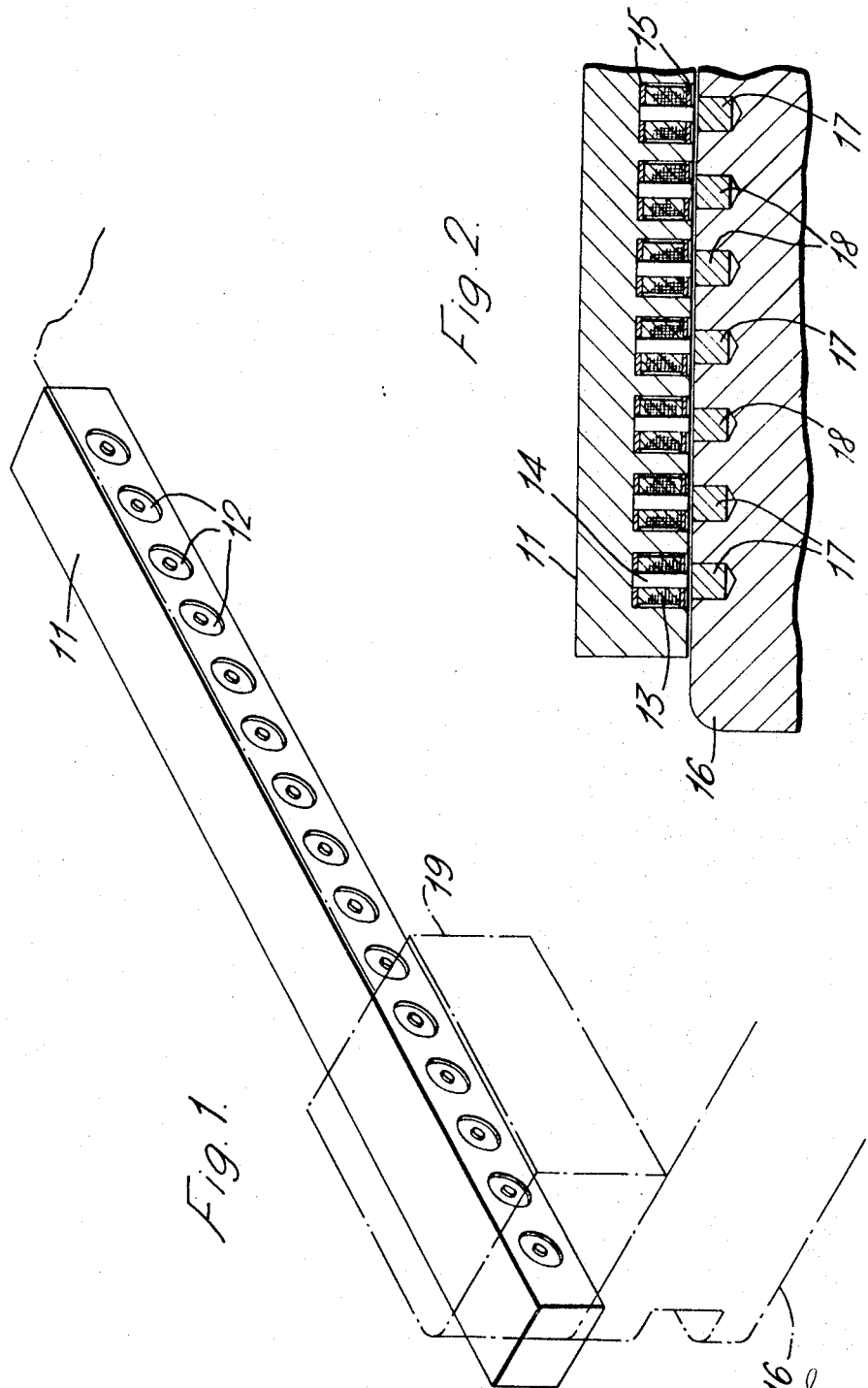

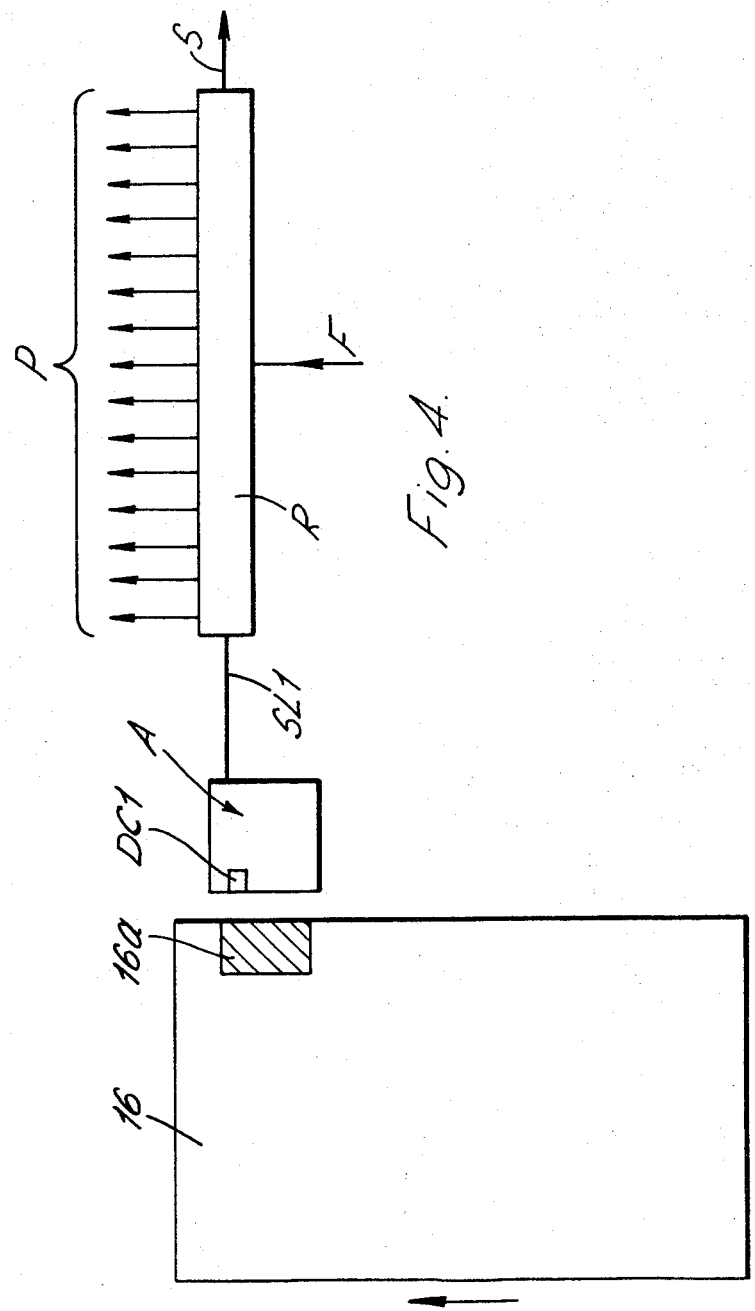

3,594,550

METHODS OF AND APPARATUS FOR IDENTIFYING ARTICLES, E.G. IN AN AUTOMATICALLY CONTROLLED SYSTEM

This invention relates to apparatus for sensing identifying markings on articles. Apparatus embodying the invention may be used for a variety of purposes, but one preferred use of such apparatus is in a computer-controlled machine tool system.

It should be noted that while in this specification reference is made to the use of "binary numbers" for identifying articles, it should be understood that this does not limit the invention to use where purely numerical identification is employed, as of course any form of identification may be used provided that it is represented in a binary-coded form (i.e. using only two symbols, conventionally 0 and 1 ). Also, references hereafter to "magnetic" and "nonmagnetic" materials are not intended to refer to materials which are respectively magnetized and not magnetized, but rather to materials which do or do not have ferromagnetic properties.

According to the invention, there is provided apparatus for sensing identifying markings on articles constituted by combinations of markers of two kinds, viz of magnetic and nonmagnetic material, carried by each article at predetermined positions to represent a binary number. A marker of one kind represents the digit 1 and a marker of the other kind represents the digit 0, said apparatus comprising at least one electromagnetic sensing device having a magnetic circuit into which one of said markers can be placed and to produce an electric output governed by the reluctance of the magnetic circuit.

Preferably, the apparatus has a plurality of sensing devices, in predetermined positions complementary to the arrangement of markers on each article, so that when an article is brought to the sensing apparatus each marker is brought into the magnetic circuit of a different one of the sensing devices; all the digits of the binary number represented by the markers on the article are then simultaneously indicated by the electric output from all the sensing devices, i.e. the number is "read" from the article in the parallel mode. However, if desired, a single sensing device may be used, and in that event means is provided for moving each article past said device so that the markers pass into and out of its magnetic circuit in sequence; the electric output of the device during the time the markers are passing through the magnetic circuit then constitutes a "readout" of the binary number in the serial mode. (A serial readout may also be obtained, of course, by moving a single sensing device relative to a stationary article.)

Conveniently, each sensing device includes a coil coupled to the magnetic circuit. As the reluctance of the magnetic circuit will be lower when a marker placed in the circuit is of magnetic material than when such marker is of nonmagnetic material, the inductance of the coil will be higher in the first instance than in the second. This difference may readily be made to produce different electric output signals; in a preferred arrangement, the coil is connected in a circuit to be energized by an alternating voltage applied through a series resistor, so that when the coil's inductance is high (because a marker of magnetic material is in the magnetic circuit) the alternating voltage across the coil is greater than when its inductance is low (because a marker of nonmagnetic material is in the magnetic circuit). The AC output may be rectified and the resulting DC signal amplified so that a final output is obtained in which two different DC voltage levels represent the digits 0 and 1; for many applications it is convenient for one of said DC voltage levels to be zero. Preferably the apparatus includes means for producing a reference voltage and means for deriving the difference between the output from the coil and the reference voltage as the final output voltage. Such a reference voltage may advantageously be produced by a further device generally similar to the sensing device(s) but which is so arranged that during operation of the apparatus the further device is always in a condition substantially the same as that of the sensing device when a selected one of the two kinds of marker is in its magnetic circuit. This effect may be achieved either by suitable housing of the further device or (where a plurality of sensing devices are provided for parallel readout) by treating the further device as an additional sensing device but providing each article with a reference marker for sensing by the further device, the reference markers of all the articles being markers of the same kind.

Apparatus in accordance with the invention will now be described, by way of example, with reference to the accompanying drawing in which:

FIG. 1 is a perspective view of apparatus for reading a binary number represented on an article which is shown in broken line, FIG. 2 is a sectional view through the apparatus and the article shown in FIG. 1;

FIG. 4 is a diagram of a modified form of apparatus, incorporating a shift register and giving both serial output and parallel output.

Figure 3:
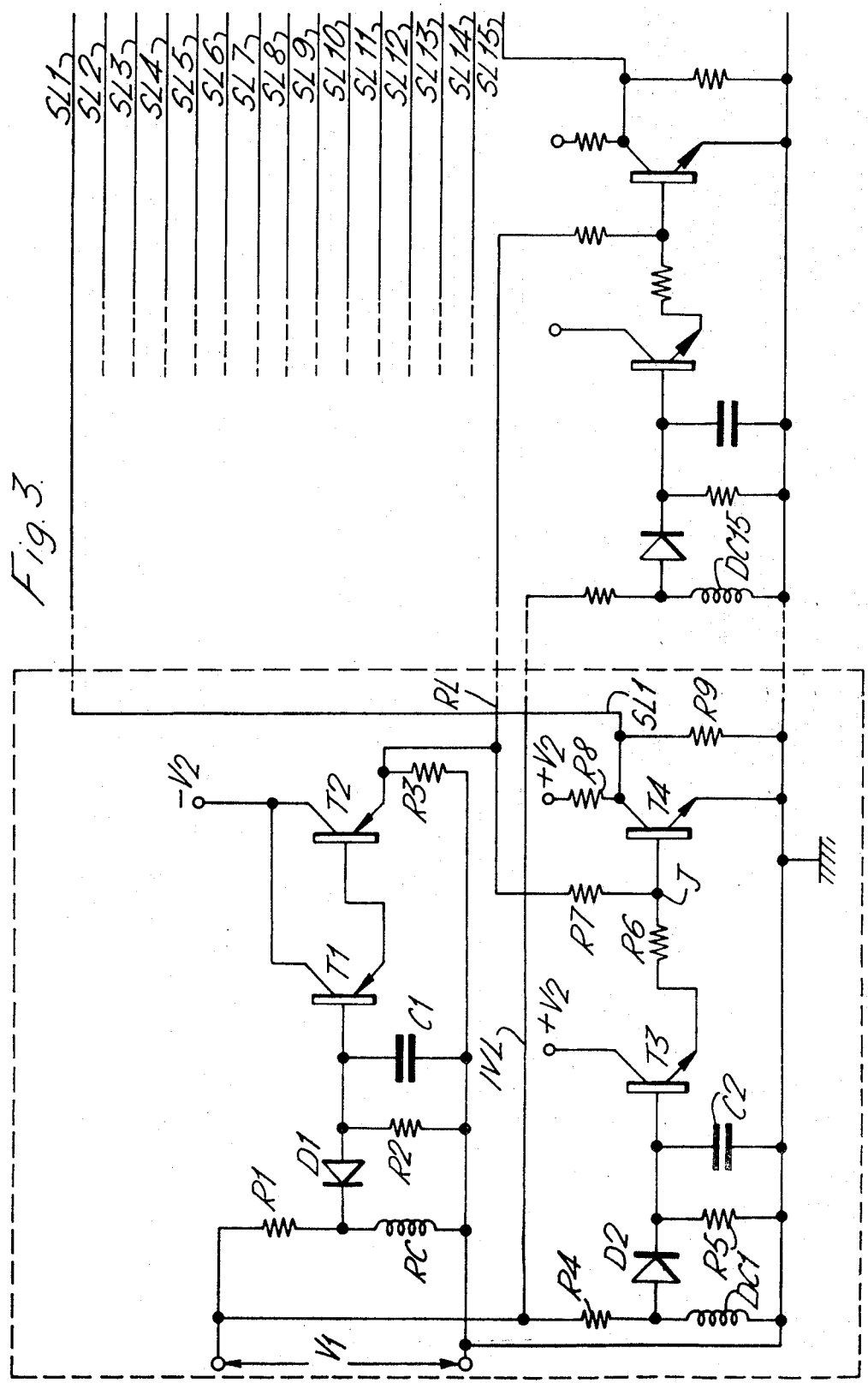
FIG. 3 is a circuit diagram illustrating the electrical connections and components used with the apparatus shown in FIGS. 1 and 2.

Referring first to FIGS. 1 and 2 the apparatus comprises a blocklike support member 11 made of magnetic material, and in the present instance of mild steel. Housed in the block 11 are electromagnetic detector devices generally indicated by the reference 12 in FIG. 1. Each detector device 12 comprises, as can be seen from FIG. 2, a detector coil 13 wound on a bobbin having a core 14 of magnetic material, around which the coil is wound, and end caps 15. The detector devices 12 are arranged at spaced positions along the block 11 with one end of each core 14 exposed and in line with the forward face of the block 11 as viewed in FIG. 1. It will be understood that each detector coil 13 is coupled to a magnetic circuit through its associated core 14 and through the surrounding material of the block 11, but having an airgap at the exposed end, i.e. at the surface of the member 11. If magnetic material is placed close to the surface of the member 11 so that the material is interposed in the magnetic circuit, the reluctance of the magnetic circuit is less than when no such material is present. This effect on the magnetic circuit can be utilized to detect the presence or absence of magnetic material adjacent the exposed end of the core 14 of a detector device.

As explained later, each detector coil 13 is arranged in an electrical circuit so that an alternating electric current is passed through the coil to establish an alternating magnetic field (i.e. to create and collapse magnetic fields of opposite polarity in alternation) in its magnetic circuit, and so that the reduction in reluctance (causing an increase in the inductance of the coil) which occurs when additional magnetic material is interposed in the magnetic circuit is apparent as an increase in output voltage across the coil.

A binary number can be represented on an article by markers of two kinds, i.e. of magnetic material and of nonmagnetic material, at spaced positions, each marker representing one "bit" of the number. Each marker of magnetic material represents one of the two digits 1 and 0, e.g. 1, and each marker of nonmagnetic material represents the other of the two digits 1 and 0, e.g. 0. An article 16 having a binary number so represented on it is shown in FIG. 2. The article has holes at spaced positions along one face, the spacing between the holes corresponding to that between the detector devices 12 in the block 11, and each hole is filled either with a plug 17 of magnetic material representing the digit 1, or with a plug 18 of nonmagnetic material representing the digit 0. Thus that part of the particular binary number represented on the article 16 shown in FIG. 2 reads, from left to right, 1101001.

If the article 16 is positioned in closely adjacent relationship to the block 11 as shown in FIG. 2 so that the plugged holes in the article register with the detector devices 12 in the block, each detector device 12 can detect whether its registering plug is of magnetic material, i.e. is a plug 17, or is of nonmagnetic material, i.e. is a plug 18. Each detector device registering with a plug 17 will have the reluctance of its magnetic circuit reduced, thereby distinguishing it from the magnetic circuits of the detector devices registering with plugs 18. In this manner the detector devices in the block 11 effectively read the binary number on the article, and, in a manner described later, the apparatus can emit a signal controlled by the magnetic circuits of the detector devices to be representative of the binary number.

It will be appreciated that various other forms of representation of the binary number on the article can be used instead of the insertion of plugs of magnetic and nonmagnetic material as described above. For example, if the article, or an appropriate part of the article, is itself of a magnetic material, holes can be made at those positions (e.g. representing the digit 0) where such material is not required, and the material of the article itself can provide the magnetic requirement of the other positions (e.g. representing the digit 1). The holes can then either be plugged with material of low magnetic permeability or, if preferred, left open. Conversely, if the article, or an appropriate part of the article, is of a nonmagnetic material, the number can be represented by making holes and inserting plugs of magnetic material at those positions where such material is required to represent one digit (e.g. 1), the other positions representing the other digit (e.g. 0) being occupied by the material of the article. As a further example, whatever the material of the article, the number can be applied thereto by affixing a suitable strip having the appropriate arrangement of holes and/or plugs, e.g. a strip of magnetic material having holes, which may or may not be plugged with nonmagnetic material, at the required positions, or a strip of nonmagnetic material with plugs of magnetic material in holes at the desired positions. Still further, the article could be provided with or have affixed thereto projecting plugs of magnetic material at the appropriate positions which represent one of the two digits.

The apparatus can advantageously be used in an automatically controlled system in which a plurality of articles are used and transported, and it is required to identify an article at a location in the system. Each of the articles can be provided with an identifying binary number represented on the article in a manner as described above, and the apparatus can be arranged at the desired location so that, when an article is positioned at that location with its binary number opposite the member 11 as shown in FIGS. 1 and 2, the number can be read and the article identified. In particular, the apparatus is suitable for use in a computer-controlled machine tool system as described in the aforementioned application in which pallets, on to which workpieces are loaded for machining, are transported, the pallets bearing identifying binary numbers, and their numbers being read at various locations in the system. The article 16 shown in FIGS. 1 and 2 is a pallet, having a datum block 19 at one corner, as described in the aforementioned application. In the system described in that application tool magazines, tape cassettes, and bins are also provided with identifying binary numbers which are required to be read at various locations in the system, and the apparatus described herein is suitable for identifying these articles also.

FIG. 3 illustrates the electrical circuitry by which the effect produced on the detector devices 12 is translated into a signal representative of the binary number being read. The apparatus includes an electromagnetic reference device which is not shown in FIGS. 1 and 2 but which is essentially identical to each of the detector devices 12 and has a central core of magnetic material around which is wound a reference coil indicated as RC in FIG. 3. The reference device is housed so that the reluctance of the magnetic circuit produced by energizing the reference coil is in operation always substantially equivalent to that of the magnetic circuit of a detector device 12 when the latter is adjacent a plug 18 of nonmagnetic material. To achieve this, the reference device may, if desired, be housed in the block 11 in exactly the same way as the detector devices 12, the articles whose binary numbers are to be read all being provided with a plug 18 of nonmagnetic material at a position which registers with the reference device when reading occurs, i.e. when the article 16 and block 11 are in the positional relationship shown in FIGS. 1 and 2. In this manner the magnetic circuit of the reference device is substantially the same as that of the detector devices facing a plug 18 (which represents the digit 0) and the magnetic circuits of the detector devices facing a plug 17 (of magnetic material and representing the digit 1) can be distinguished by comparison with the magnetic circuit of the reference device.

An alternating input voltage is applied across the reference coil RC and a resistor R1 arranged in series therewith. The alternating output voltage across the reference coil RC alone is rectified by means of a diode D1 with a resistance-capacitance load provided by a resistor R2 in parallel with a capacitor C1, and is applied to the base of a PNP-type transistor T1 whose collector has a negative voltage −V2 applied thereto. The emitter of the transistor T1 connects with the base of a further transistor T2 to whose collector a negative voltage −V2 is also applied, the transistors T1 and T2 being Darlington-connected emitter followers. The emitter of the transistor T2 is loaded with a resistor R3 and connects with a reference line RL.

Each detector coil 13, of which one indicated as DC1 is shown at the bottom left-hand corner of FIG. 3, has the input alternating voltage V1 applied across the coil and a resistor R4 arranged in series therewith. The alternating output voltage across the detector coil alone is rectified by means of a diode D2 with a resistance-capacitance load provided by a resistor R5 in parallel with a capacitor C2, and is applied to the base of an NPN-type transistor T3 whose collector has a positive voltage +V2 applied thereto. The emitter of the transistor T3 connects, through a resistor R6, with a junction J. One line from the junction J connects, through a resistor R7, with the reference line RL, and the other line connects with the base of an NPN-type output transistor T4 whose emitter is grounded. A positive voltage of +V2 is applied through a resistor R8 to the collector of the transistor T4, which also connects with a signal line SL1 across a load resistor R9.

When a binary number is read by the apparatus in the manner explained above, the output voltage across the detector coil is dependent upon whether the detector device is opposite a plug 17 of magnetic material or a plug 18 of nonmagnetic material. If the detector device is opposite a plug 17 of magnetic material which decreases the reluctance of the magnetic circuit thereby increasing the inductance of the detector coil, the output voltage across the coil will be greater than that when the detector device is opposite a plug 18 of nonmagnetic material (when the magnetic circuit will have a greater reluctance and the coil will have a lower inductance). The output voltage across the detector coil is rectified, as described above, and applied to the base of the transistor T3 whose output is fed to the junction J, which acts as a Kirchhoff adder, by means of which the output voltage across the detector coil DC1 can be compared with the output voltage across the reference coil RC.

As is apparent from the circuits shown in FIG. 3, the reference voltage applied to the reference line RL representative of the output voltage across the reference coil RC is of the opposite polarity to the detected voltage from the detector coil. Thus, if the reference voltage substantially equals the detected voltage the current flow through the resistors R6 and R7 via the junction J will be substantially equal, and the voltage at junction J will be such that the output transistor T4 is effectively cut off. If, on the other hand, the detected voltage exceeds the reference voltage, the voltage applied to the base of the output transistor T4, which connects with the junction J, will cause a signal voltage to be established on the signal line SL1.

Preferably, the reference voltage is arranged to be greater in magnitude than the detected voltage when the detector device is opposite a plug 18 of nonmagnetic material, for example by about 20 percent, so that a signal on the line SL1 is only established when the detector device is opposite magnetic material provided by a plug 17 and the detected voltage is considerably greater, e.g. by more than the 20 percent, than that occurring when the detector device is opposite a plug 18 of nonmagnetic material.

In the particular embodiment described the voltage and component values are as follows:

$V_1$=50 v. R.M.S.
+$V_2$=+24 v.
−$V_2$=−24 v.
R1 =9.1 K
R2 =100 K
R3 =100 K
R4 =10 K
R5 =100 K
R6 =4.7 K
R7 =4.7 K
R8 =10 K
R9 is of a value selected to reduce the output on the signal line to a required voltage level
C1 =2.2 μf., 35 v.
C2 =2.2 μf., 35 v.
RC } Identical coils of 6000 turns
DC1 }        47 S.W.G.

The transistors T1 and T1 are identical, as are the transistors T3 and T4; T1 and T2 may each be of type 2N3702, and T3, T4 may each be of type 2N3704, although the actual types of transistor used is not important in these emitter-follower circuits. The resistors and inductance reference and detector coils may have a ±2 percent tolerance. The detector device cores 14 are 3 mm. in diameter and the plugs 17 and 18 have a 10 mm. diameter, the pitch of the plugs and detector devices being 14 mm.

By this arrangement a voltage swing of 10 volts can be detected as between a detector device opposite a plug 17 of magnetic material and a detector device opposite a plug 18 of nonmagnetic material when a gap of one-thousandth of an inch is left between the plug and the detector core 14. If this gap is increased to fifteen-thousandths of an inch the voltage swing is reduced to 4 volts. The materials of the plugs 17 and 18 are a suitable ferrous material, such as cast iron, and a suitable nonferrous material, such as plastic, respectively. However, as explained previously, if the article 16 is itself of magnetic material, such as cast iron, unplugged holes can be provided at those positions corresponding to the plugs 18, so that a detector device opposite such a position is opposite air, and the material of the article can serve the purpose of the plugs 17.

It will be appreciated that a detector circuit as described above, i.e. comprising the components R4, R5, R6, R7, R8, R9, D2, C2, T3 and T4 is provided in association with each detector coil, the input voltage V1 being applied across each detector coil and its series resistor R4 from an input voltage line IVL, and each detector circuit having its resistor R7, connected to the reference line RL, i.e. the detector circuits are arranged in parallel along the lines IVL and RL. In the particular embodiment described there are 15 detector devices 12 and hence 15 detector circuits, but for convenience FIG. 3 shows only two detector circuits, one associated with the first detector coil DC1 and the other associated with the 15th detector coil DC15.

Signal lines SL1 to SL15 emanate from the detector circuits and when a binary number is being read a signal is established on each signal line whose detector device is opposite a plug 17 of magnetic material in the manner described above. The signal lines SL1 to SL15 therefore together carry a signal representative of the binary number being read, which signal can be communicated to control means controlling the system in which the apparatus is being used, thereby identifying the article whose number is being read to the control means. Thus, in particular, if the apparatus is used in a computer-controlled machine tool system as described in the aforementioned application, the signal lines SL1 to SL15 can be constituted by, or connect with, the "Data" lines described in that application.

It will be appreciated that the number of detector devices and signal lines, which is 15 in the described embodiment, can be chosen to meet requirements. The 15 devices described enables a 15-"bit" binary number to be read, which may, in practice, be made up of a 12-"bit" binary number and three "-bits" used to provide a check, e.g. a Modulus Seven check.

FIG. 4 illustrates diagrammatically a modified apparatus embodying the invention which is capable of reading a binary number represented on a moving article and producing both a serial and a parallel electrical output representing such number. The article 16 (as in FIGS. 1 and 2) with its 15 plugs 17, 18 (FIG. 2) contained in the shaded region 16a, moves past a stationary sensing unit A containing the electrical circuitry shown in FIG. 3 within a dashed-line enclosure also marked A. In particular, this unit includes the detector coil DC1 and as indicated in FIG. 4 this component is so placed in the unit A as to be confronted by the plugs 17, 18 in sequence as the movement of article 16 carries them past the unit A.

The signal line SL1 will accordingly carry a voltage which at any instant that one of the plugs 17, 18 is aligned with the coil DC1 will indicate whether that plug is one of the plugs 17 (i.e. is of magnetic material, representing the digit 1) or one of the plugs 18 (of nonmagnetic material, representing the digit 0). The signal line SL1 is connected to a shift register R, and at each instant a plug is aligned with coil DC1, a functional input F of said register is impulsed to cause a right shift in the register, causing the first (left-hand) bistable stage of the register to be set to the condition (i.e. to represent 0 or 1) corresponding to the voltage on line SL1, while the second stage assumes the condition previously sustained by the first stage, and so on; in short, the first stage goes to a condition corresponding to the type of plug then aligned with the coil DC1, while similar digital indications stored during the passage of previous plugs past the coil DC1 are each shifted one place to the right. The register R has 15 stages (equal to the number of binary digits represented by the plugs) and (whatever the initial state of the register) when the 15 plugs of article 16 have moved past coil DC1, the register will contain, in correct sequence, stored indications of the binary digits represented by the plugs 17, 18 of that article.

A further 15 impulses applied to the input F, while a zero-representing voltage is maintained on line SL1, will cause the register R to shift another 15 times to the right, delivering on a serial output line S a sequence of pulses representing the stored binary digits and clearing the register R. While the register R contains the stored indications of all 15 digits, however, these digits may be read out simultaneously on a set of parallel output lines P (whether this clears the register or not depends upon the internal structure of the register).

It will be apparent that the apparatus of FIG. 4 can only operate relatively slowly as the digital indications derived from the plugs 17, 18 of an article 16 are being stored, as the speed at which the register R can be operated depends upon the speed of travel of the article. Once all the digital indications are in storage, however, the register can be read out (either in the parallel or the series mode) at much greater speed. The register R may if desired be of such form that each number stored can be read out in both modes and/or repeatedly read out in either mode.

What we claim as our invention and desire to secure by Letters Patent is:

1. Apparatus for sensing article-identifying markings constituted by combinations of markers of two kinds, viz of magnetic and nonmagnetic material, carried by each article at predetermined positions to represent a binary number, a marker of one kind representing the digit 1 and a marker of the other kind representing the digit 0, said apparatus comprising at least one electromagnetic sensing device including a magnetic circuit into which one of said markers can be placed to produce an electric output governed by the reluctance of said magnetic circuit, each said sensing device including a coil coupled to the magnetic circuit, means for producing a reference voltage and means for deriving the difference between the output from the coil and said reference voltage as the final output voltage.

2. Apparatus as claimed in claim 1, in which the means for producing the reference voltage comprises a further device including a magnetic circuit having a reluctance which is always in a condition substantially the same as that of the sensing device when a selected kind of marker is in its magnetic circuit.

3. Apparatus for sensing article-identifying markings constituted by combinations of markers of two kinds, viz of magnetic and nonmagnetic material, carried by each article at predetermined positions to represent a binary number, a marker of one kind representing the digit 1 and a marker of the other kind representing the digit 0, said apparatus comprising an electromagnetic sensing device including a magnetic circuit into which one of said markers can be placed to produce an electric output governed by the reluctance of said magnetic circuit, means for moving each article past said sensing device so that the markers therein pass into and out of the magnetic circuit of the device in sequence to produce an output signal comprising a series of pulses on a single output line, said single output line connected to deliver said pulses to a shift register so that after all said markers have passed into and out of the magnetic circuit said shaft register contains a stored representation of the binary number represented by said markers, said shift register being operable to read out said stored representation in the serial or the parallel mode.

UNITED STATES PATENT OFFICE
CERTIFICATE OF CORRECTION

Patent No. 3,594,550          Dated July 20, 1971

Inventor(s) David Theodore Nelson Williamson et al

It is certified that error appears in the above-identified patent and that said Letters Patent are hereby corrected as shown below:

In the heading of the patent, lines 2 and 3 of the names of the inventors, change "Richard Graham Grosland" to --Richard Graham Crosland--.

Signed and sealed this 25th day of January 1972.

(SEAL)
Attest:

EDWARD M. FLETCHER, JR.
Attesting Officer

ROBERT GOTTSCHALK
Commissioner of Patents